Figure 1:
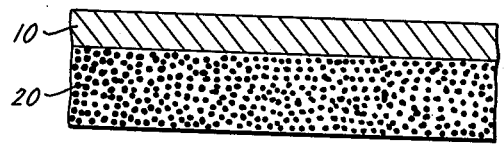

Jan. 7, 1964     E. STRAUSS     3,117,018

COLOR TRANSFER MEDIUM AND METHOD OF PRODUCING THE SAME

Filed Oct. 20, 1960

INVENTOR.
Eugen Strauss
BY
Michael S. Striker

United States Patent Office 3,117,018
Patented Jan. 7, 1964

3,117,018
COLOR TRANSFER MEDIUM AND METHOD OF PRODUCING THE SAME
Eugen Strauss, Via Cadolini 32, Milan, Italy
Filed Oct. 20, 1960, Ser. No. 63,930
Claims priority, application Austria Nov. 3, 1958
15 Claims. (Cl. 117—36.1)

The present invention relates to color transfer media and a method for the production of the same, particularly of the carbon paper type including colored carbon paper ribbons, i.e. color transfer media which upon application of pressure discharge color to a base.

The present application is a continuation-in-part of my copending application Serial Number 794,249, filed February 19, 1959, entitled "Method for the Production of Color Transfer Media," and now abandoned.

The object of the invention is to provide a transfer sheet and a method for the production of carbon or copying papers, comprising a paper backing carrying the color layer, said layer consisting of a color carrier on a plastic base as well as the color dispersed therein. So far waxy compositions have been employed as color carriers in the production of carbon papers, copying papers and like writing implements offsetting color upon application of pressure; however, of late, it has been suggested to replace the wax or waxy components of the color layer, such as carnauba wax, paraffin and the like, by non-waxy plastic materials thus gaining various advantages. The plastic body adheres to the surface of the paper without penetrating into the paper to a degree such as is the case with the waxy melt which is applied hot to the paper; it masks the paper well thus permitting the use of lower grade paper.

Up to now soft plastic materials, particularly vinyl chloride-acetate copolymer resins have been regarded as being most suitable as layer formers for carbon paper and copying paper. Such color transfer layers on plastic base contain for instance vinyl chloride-acetate copolymers composed of about 85 to 90% vinyl chloride and 15 to 10% vinyl acetate. Such copolymers resins are preferably dissolved in a volatile solvent; thereupon this solution is ground with non-drying vegetable oils and/or non-drying mineral oils, as well as with coloring matter which consists of natural or synthetic pigments. To these pigments oil-soluble or water-soluble dyes may have been added. The addition of a fatty acid such as oleic acid has been recommended in cases where oil-soluble basic dyes are employed.

It is further known to disperse a dye in a volatile solvent, to dissolve or disperse in the same solvent a material containing a soft plastic and to apply the dispersion containing the dyes and the resin to the base; after this the drying is performed for instance with the aid of a cold or warm current of air.

Furthermore it is known to form porous carrier layers by evaporation of solvents and dispersion agents from dispersions of plastic material and coloring matter.

However, the color transfer compositions produced according to established processes still show essential deficiencies such as a color discharge which, at first being considerable, later on greatly diminishes, i.e. that such papers provide copies with strongly varying intensities; furthermore, such papers often discharge color too easily upon finger pressure and are comparatively expensive; the technical production of such papers in a uniform quality is also difficult to control. Experiments with cheaper plastics soluble in cheaper solvents were carried out in order to overcome said disadvantages.

Attempts have been made to replace the copolymers, heretofore employed as layer formers by polystyrene which is cheaper as such and also soluble in cheaper solvents (chlorinated hydrocarbons). However, great difficulties have thereby been encountered because polystyrene yields very hard films.

Experiments to render such hard films applicable as carrier layer with the aid of commonly used plasticisers such as dibutylphthalate were not successful. As soon as the desired degree of softness has been achieved, the tackiness of such films becomes too great. The use of secondary plasticisers, i.e. of plasticisers which do not dissolve the plastic materials, such as vegetable oils or mineral oils, resulted in the production of a colloidal film. The degree of cohesion of this film was too high in order to render a color discharging plastic layer after the dyes have been added. Experiments with hard, i.e. highly polymerized polyvinyl acetate ($k$ value $-90$) yielded the same negative results.

It is therefore an object of the present invention, to provide a color transfer medium which will overcome the above-discussed difficulties and disadvantages.

Other objects and advantages of the present invention will become apparent from a further reading of the description and of the appended claims.

With the above and other objects in view, the present invention includes a method of producing a transfer sheet, comprising the steps of applying to one face of a support sheet a coating consisting essentially of a flowable intimate mixture of a monopolymer having a Rockwell hardness of at least M–65, a solvent therefor and at least one pigment in an amount at least equal to the weight of the monopolymer, and drying the coating so as to transform the same into a solid transfer layer, the transfer layer being easily and accurately transferable upon application of pressure due to the pigment forming part thereof.

The present invention also contemplates a transfer sheet, comprising in combination, a support sheet, and a transfer layer on one face of the support sheet, the transfer layer consisting essentially of a solid intimate mixture of at least one monopolymer having a Rockwell hardness of at least M–65 and selected from the group consisting of polycarbonate, polystyrene, polyvinyl acetate having a $k$ value of about 90, highly polymerized chlorinated rubber and cyclicized rubber, a secondary plasticizer selected from the group consisting of vegetable and mineral oils incapable of dissolving the monopolymer, a fatty acid amide, and an effective amount equal to at least 50% of the weight of the coating after drying of the same of a pigment mixture comprising a major portion of at least one inert pigment selected from the group consisting of kaolin, precipitated calcium carbonate and shale powder, and a minor portion of a coloring pigment, the transfer layer being easily and accurately transferable upon application of pressure due to the pigment distributed therethrough.

Surprisingly enough it was found to be possible and advantageous to use hard plastics of high polymerization degree in color transfer layers by imparting to the layer which is about to be formed the required degree of softness and cohesion by adding certain amounts of pigments, preferably inert pigments. This is of great advantage because it makes possible the use of per se hard plastics which are cheaper and at the same time soluble in less expensive, non-inflammable and non-explosive solvents. Thereby color transfer media on the base of such per se hard plastics are produced; these media are superior to those hitherto applied because their production is cheaper, uniform copies can be obtained and in addition these media lack smearing characteristics.

Thus the object of the invention is the production of color transfer media particularly of the carbon paper type, with a color transfer layer on a plastic base comprising a per se hard plastic having a Rockwell hardness of at least M-65 and of high polymerization degree and of high viscosity or a mixture of such plastics not consisting of copolymers which are being processed according to methods well known in the production of color transfer layers by incorporating one or several pigments with the lowest possible degree of oil absorption in an amount sufficient to produce a layer suitable as color transfer.

According to the present invention secondary plasticizers are being preferred. It was found to be advantageous to use vegetable oils together with fatty acids. Furthermore it was found that the colloidal structure of the color discharging layer can be stabilized by the addition of the amide of oleic acid and palmitic acid which is capable of dissolving a certain percentage of basic dyes thus aiding the improvement of the hue.

The pigment to be added according to the present invention may be one of the commonly used coloring pigments. However, non-coloring inert pigments which are far cheaper, are preferred. Thus it is advantageous to use one or several coloring pigments in addition to larger amounts of an inert pigment in order to achieve the desired shale. Inert pigments found suitable according to the present invention are e.g. kaolin, precipitated calcium carbonate, shale powder, etc.

Suitable plastics which have a Rockwell hardness of at least M-65 are: polycarbonate, polystyrene, highly polymerized polyvinyl acetate, chlorinated rubber of high viscosity i.e. of a high degree of polymerization as well as cyclicized rubber.

The color transfer layer is produced according to established procedures. Thus the hard plastic may be dissolved in the solvent, this solution thereafter being blended with a dispersion containing the dye, the pigment or pigments as well as the vegetable oil and eventually the fatty acid and the fatty acid amide. It has been found according to the present invention that pigment should be present in a quantity at least equal to the weight of the monopolymer, preferably equal to at least 50% of the weight of the entire color transfer layer, or between about 120% and 160% of the weight of the monopolymer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which: the five figures of the drawing are schematic illustrations in cross section of the transfer sheet according to the present invention and of the use of the same.

In all figures of the drawing reference numeral 10 denotes the support sheet, reference numeral 20 the porous transfer layer preferably consisting of a polycarbonate, a secondary softener and a coloring matter, reference numeral 30 the sheet onto which indicia or the like are to be transferred, reference numeral 40 the key of a typewriter exerting the pressure required for forming the transfer, and reference numeral 50 the indicia adhering to sheet 30.

Figure 2:
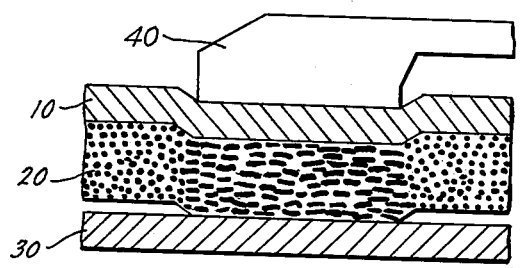
Figure 3:
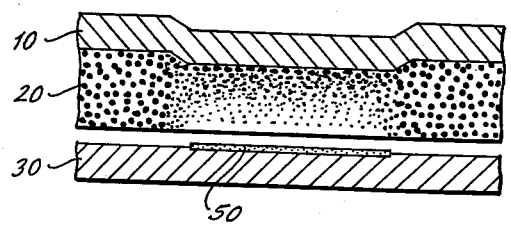
Figure 4:
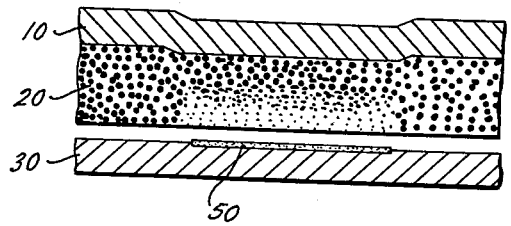
Figure 5:
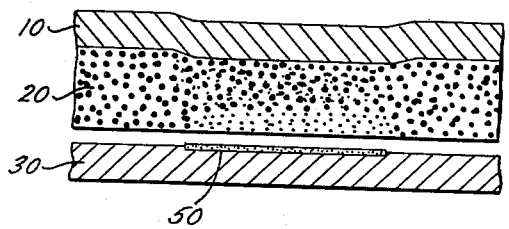

In FIG. 1, the transfer sheet is illustrated prior to use, in FIG. 2 it is shown how pressure is applied by means of the typewriter key so as to transfer a corresponding ink image onto sheet 30; FIG. 3 illustrates the transfer sheet 30 after withdrawal of typewriter key 40; FIG. 4 illustrates subsequent partial regeneration of the transfer sheet, particularly of the transfer layer; and FIG. 5 illustrates the transfer layer after substantially complete regeneration of the same, and indicia 50 adhering to sheet 30.

The following compositions can be processed according to the present invention:

EXAMPLE 1

| | Percent |
|---|---|
| Polystyrene | 7.00 |
| Oleic acid amide | 4.00 |
| Castor oil | 5.15 |
| Oleic acid | 1.95 |
| Reflex blue or coloring pigments | 3.65 |
| Kaolin or precipitated calcium carbonate | 7.25 |
| Trichlorethylene or methylene chloride | 71.00 |
| [1] | 100.00 |

[1] Containing pigment in a quantity equal to 156% of the weight of the monopolymer.

EXAMPLE 2

| | Percent |
|---|---|
| Mowilith, a polyvinyl acetate ($k=90$) | 7.00 |
| Stearyl palmitic acid amide | 4.00 |
| Castor oil | 3.00 |
| Fenclor 54 [2] | 2.15 |
| Oleic acid | 1.95 |
| Coloring pigment | 1.65 |
| Victoria pure blue | 2.00 |
| Inert pigment (such as kaolin, shale, powder, etc.) | 7.25 |
| Trichlorethylene | 71.00 |
| [1] | 100.00 |

[1] Pigment equal to 127% of monopolymer weight.
[2] Fenclor is a polychloridiphenyl manufactured by "Societa Elettrica e Elettrochimica del Caffaro, Milano."

EXAMPLE 3

| | Percent |
|---|---|
| Polystyrene | 7.00 |
| Oleic acid amide | 4.00 |
| Castor oil | 5.15 |
| Oleic acid | 1.95 |
| Carbon black (gas black) | 3.65 |
| Kaolin or another inert pigment | 3.00 |
| Highly dark pigment | 2.25 |
| Blue base (lacquer) | 2.00 |
| Trichlorethylene or methylenchloride | 71.00 |
| [1] | 100.00 |

[1] 127% pigment.

EXAMPLE 4

| | Percent |
|---|---|
| Polyvinyl acetate of high viscosity | 4.00 |
| Chlorinated rubber of high viscosity | 5.00 |
| Oleic acid amide | 3.00 |
| Castor oil | 4.15 |
| Oleic acid | 1.95 |
| Reflex blue | 1.65 |
| Victoria blue BGO | 2.00 |
| Kaolin | 7.25 |
| Trichlorethylene or methylenchloride | 71.00 |
| [1] | 100.00 |

[1] 121% pigment.

In accordance with the present invention, all of the monopolymers listed in the examples possess a Rockwell hardness of at least M-65. The "$k$" value given for some of the monopolymers is a measure of the degree of polymerization of the same developed by Kikentscher. A "$k$" value of 90 indicates a degree of polymerization of about 5,000 and a molecular weight of about 430,000.

Thus, according to the present invention, the transfer layer will consist of a synthetic resin having a Rockwell hardness of at least M-65, or of a mixture of such resins, for instance, polystyrene (Rockwell hardness between M-65 and M-85), chlorinated rubber (Rockwell hardness between M-80 and M-110), polycarbonate (Rockwell hardness about 70), polyvinyl acetate ("$k$" value of at least 90), or cyclicized rubber (also having a Rockwell hardness of at least M-65).

As pigments, preferably inert pigments are used in a quantity at least equal to the quantity of monopolymer but preferably equal to between 120% and 160% of the weight of the monopolymer. Preferred pigments are kaolin, calcium carbonate powder or finely ground shale as softeners. Preferably secondary softeners, especially vegetable oils with fatty acids and/or fatty acid amides are used according to the present invention, and as solvents for the monopolymer, preferably chlorinated hydrocarbons. It is also possible to replace up to 50% of the monopolymer with other compatible synthetic materials as will be described in detail further below. The inert pigments may also include or have admixed thereto coloring pigments.

According to one preferred embodiment of the present invention, the monopolymer of the transfer layer will be a polycarbonate of the general formula:

*Formula I*

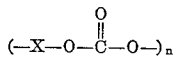

or a mixture of synthetic materials may be used which contains such polycarbonate and up to an equal amount by weight of one or more synthetic materials compatible with the polycarbonate. In the formula hereinabove, "$n$" is a whole number higher than 100, and "X" represents an alkyl or substituted alkyl radical, or a cycloalkyl radical or an aryl radical or a combination of two or more of these radicals.

Experiments carried out with transfer sheets according to the present invention and those of the prior art have shown that the useful life span of the transfer sheets according to the present invention, such as transfer sheets containing a polycarbonate, was greatly lengthened. Color intensity, clarity and sharpness of the edges of transfer images formed with transfer sheets according to the present invention were superior to those of the prior art, whereby for the purpose of these comparison experiments equal quantities of identical coloring materials were applied per square meter of transfer sheet. Without limiting the present invention to any specific theory, it may be assumed that the superior results according to the present invention are at least to some extent the result of the different size of the microscopically small cavities in the sponge-like structure of the transfer layer. These cavities or pores of a conventional polyvinyl chloride-acetate layer are smaller than those formed in a polycarbonate containing transfer layer according to the present invention. Thus, the conventional transfer layer might resist the passage of coloring pigments of the ink to a higher degree than the transfer layer of the present invention with its relatively larger pores. The conventional transfer layer might exercise a filtering effect, allowing the liquid medium of the ink to pass while retaining a portion of the dispersed pigment. Consequently, the transferred portion of the ink will be relatively low on pigment content. This will adversely affect the sharpness of the edges of the transferred indicia or image.

Furthermore, it appears that the transfer sheets according to the present invention can be produced in a particularly simple and economical manner. Polycarbonates are soluble in chlorinated hydrocarbon solvents, i.e. in low-cost non-inflammable and non-explosive solvents, while for instance the prior art mixed polymerizates of vinyl chloride and vinyl acetate require expensive and inflammable solvents such as ketones.

According to another embodiment of the present invention, the useful life span of the transfer sheets containing hard monopolymer, can be prolonged and the uniformity of reproduction can be improved and prolonged by incorporating in the transfer coating certain organic substances, namely organic substances which possess at least one functional group with a single electron pair standing alone. These groups include hydroxyl, carbonyl, amino, ester, fatty acid amide, carboxyl and quinon groups. The preferred substances of this kind are those which comprise more than one of such functional groups and which are of relatively large molecular weight.

A preferred group of compounds possessing at least one functional group which includes an electron pair standing alone comprises the imidazoline compounds which possess the following structure:

*Formula II*

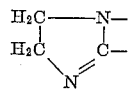

for instance the imidazoline derivative of the following formula:

*Formula III*

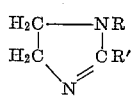

in which R represents an alkyl group with between one and six carbon atoms and R' an alkyl group with at least ten carbon atoms. Such a compound is made commercially available by Geigy Corporation under the trade name "Amin C."

The polycarbonates which form an essential constituent of the transfer coating according to the present invention include those which are commercially available under the name Lexan, particularly Lexan 105 of General Electric Corporation, or Makrolon and Makrolon S distributed by Farbwerke Bayer, Leverkusen.

Makrolon is the polycarboxylic acid ester of 4,4'-dihydroxydiphenyl-2,2-propane which has the formula:

*Formula IV*

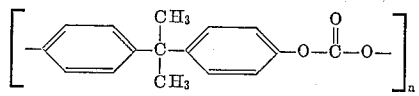

Lexan which is further described as "bisphenol-A-polycarbonate resin" also corresponds to the above formula, while "bisphenol-B-polycarbonate resin" is the polycarboxylic ester of 4,4'-dihydroxydiphenyl-2,2-propane. "Bisphenol-C-polycarbonate resin" is an ester corresponding to Formula IV in which a methyl group appears in the "3" position of each of the two phenyl groups.

The polycarbonate containing coating is applied to a backing sheet in the form of a solution or dispersion in a manner known per se and conventional for applying coatings of synthetic material to backing sheets in the art to which the invention pertains.

Polycarbonates are compatible with many synthetic materials such as rubber and chlorinated rubber, as well as several vinyl resins, for instance mixed polymerizates of vinyl chloride and vinylidene chloride. It is therefore also within the scope of the present invention to form transfer coatings which in addition to the polycarbonate or other hard monopolymer of the present invention also include varying amounts of other synthetic materials which are compatible with the hard monopolymer. Such additions are sometimes desirable in order to achieve special results under specific transfer conditions, or also in order to reduce the costs of producing the transfer sheet.

Polycarbonate containing transfer layers according to the present invention are described in the examples hereinbelow. However, the present invention is not to be considered limited to the specific details of any of the examples appearing in this specification.

EXAMPLE 5

| | Parts by weight |
|---|---|
| Polycarbonate | 8 |
| Castor oil | 6 |
| Stearic acid-palmitic acid-amide | 4 |
| Ricinoleic acid | 2 |
| Carbon black | 8 |
| Aerosil | 1 |
| Coloring pigment | 3 |
| Methylene chloride | 50 |
| Trichloroethylene | 18 |

EXAMPLE 6

| | |
|---|---|
| Polycarbonate | 4 |
| Polyvinylchloride-polyvinylidene-chloride (Geon 222) | 4 |
| Mineral oil | 8 |
| Ricinoleic acid | 3 |
| Carbon black | 6 |
| Victoria blue | 2 |
| Coloring pigments, f.i. ultramarine Blue or phthalocyanine blue | 8 |
| Methylene chloride | 30 |
| Trichloroethylene | 35 |

EXAMPLE 7

| | |
|---|---|
| Polycarbonate | 7 |
| Chlorinated rubber | 3 |
| Castor oil | 9 |
| Oleic acid amide | 4 |
| Ricinoleic acid | 4 |
| Carbon black | 7 |
| Phthaloyanine blue | 6 |
| Methylene chloride | 30 |
| Dichloroethane | 30 |

EXAMPLE 8

| | |
|---|---|
| Polycarbonate | 4 |
| Chlorinated rubber | 3 |
| Mineral oil | 9 |
| Oleic acid | 5 |
| Phthalocyanine blue | 5 |
| Coloring pigments | 2 |
| Victoria blue base | 2 |
| Methylene chloride | 70 |

EXAMPLE 9

| | |
|---|---|
| Makrolon S | 1.00 |
| Castor oil | 1.75 |
| Carbon black | 0.25 |
| Kaolin | 1.25 |
| Amin C | 0.10 |
| Methylene chloride | 10.00 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Method of producing a transfer sheet, comprising the steps of applying to one face of a support sheet a coating consisting essentially of a flowable intimate mixture of a polycarbonate, a solvent therefor, a secondary plasticizer incapable of dissolving said polycarbonate and coloring matter including pigment in an amount at least equal to the weight of said polycarbonate; and drying said coating so as to transform the same into a solid transfer layer, including said polcarbonate as non-transferable carrier for the transferable material thereof.

2. Method of producing a transfer sheet, comprising the steps of applying to one face of a support sheet a coating consisting essentially of a flowable intimate mixture of a polycarbonate, a solvent therefor, a secondary plasticiser incapable of dissolving said polycarbonate, coloring matter and at least one inert, colorless pigment in an amount at least equal to the weight of said polycarbonate; and drying said coating so as to transform the same into a solid transfer layer including said polycarbonate as non-transferable carrier for the transferable material thereof.

3. Method of producing a transfer sheet, comprising the steps of applying to one face of a support sheet a coating consisting essentially of a flowable intimate mixture of a polycarbonate, a solvent therefor and a non-coloring pigment mixture in an amount at least equal to the weight of said polycarbonate, said pigment mixture comprising a major portion of an inert pigment and a minor portion of a coloring pigment; and drying said coating so as to transform the same into a solid transfer layer including said polycarbonate as non-transferable carrier for the transferable material thereof.

4. Method of producing a transfer sheet, comprising the steps of applying to one face of a support sheet a coating consisting essentially of a flowable intimate mixture of a polycarbonate, a solvent therefor and an effective amount equal to at least the weight of said polycarbonate of a pigment mixture comprising a major portion of an inert non-coloring pigment selected from the group consisting of kaolin, precipitated calcium carbonate and shale powder, and a minor portion of a coloring pigment; and drying said coating so as to transform the same into a solid transfer layer including said polycarbonate as non-transferable carrier for the transferable material thereof.

5. Method of producing a transfer sheet, comprising the steps of applying to one face of a support sheet a coating consisting essentially of a flowable intimate mixture of a polycarbonate, a solvent therefor, a secondary plasticiser selected from the group consisting of vegetable and mineral oils incapable of dissolving said polycarbonate, and an effective amount of a coloring matter including pigment in an amount at least equal to the weight of said polycarbonate; and drying said coating so as to transform the same into a solid transfer layer including said polycarbonate as non-transferable carrier for the transferable material thereof.

6. Method of producing a transfer sheet, comprising the steps of applying to one face of a support sheet a coating consisting essentially of a flowable intimate mixture of a polycarbonate, a solvent therefor and an effective amount aqual to at least the weight of said polycarbonate of at least one pigment; and drying said coating so as to transform the same into a solid transfer layer including said polycarbonate as non-transferable carrier for the transferable material thereof.

7. Method of producing a transfer sheet, comprising the steps of applying to one face of a support sheet a coating consisting essentially of a flowable intimate mixture of a polycarbonate, a solvent therefor, a secondary plasticizer selected from the group consisting of vegetable and mineral oils incapable of dissolving said monopolymer, a fatty acid amide, and coloring matter including pigment in an amount at least equal to the weight of said polycarbonate; and drying said coating so as to transform the same into a solid transfer layer including said polycarbonate as non-transferable carrier for the transferable material thereof.

8. Method of producing a transfer sheet, comprising the steps of applying to one face of a support sheet a coating consisting essentially of a flowable intimate mixture of a polycarbonate, a solvent therefor selected from the group consisting of trichloro ethylene and methylene chloride, a secondary plasticizer selected from the group consisting of vegetable and mineral oils incapable of dissolving said polycarbonate, a fatty acid amide, and an effective amount equal to at least the weight of said polycarbonate of a pigment mixture comprising a major portion of at least one inert pigment selected from the group consisting of kaolin, precipitated calcium carbonate and shale powder, and a minor portion of a coloring pigment; and evaporating said solvent so as to transform said coating on said support sheet into a solid transfer layer including said polycarbonate as non-transferable carrier for the transferable material thereof.

9. A transfer sheet, comprising in combination, a support sheet; and a transfer layer on one face of said support sheet; said transfer layer consisting essentially of a solid intimate mixture of a polycarbonate, a secondary plasticizer selected from the group consisting of vegetable and mineral oils incapable of dissolving said polycarbonate, a fatty acid amide, and a pigment mixture in an amount at least equal to the weight of said polycarbonate, said pigment mixture comprising a major portion of at least one inert pigment selected from the group consisting of kaolin, precipitated calcium carbonate and shale powder, and a minor portion of a coloring pigment.

10. A transfer sheet, comprising in combination, a support sheet; and a transfer layer on one face of said support sheet, said transfer layer comprising a solid intimate mixture of a substantially non-transferable polycarbonate carrier and of at least one transferable pigment in an amount at least equal to the weight of said polycarbonate.

11. A transfer sheet according to claim 10 wherein at least one synthetic polymer different from and compatible with said polycarbonate is incorporated in said transfer layer in a quantity not exceeding the weight of said polycarbonate.

12. A transfer sheet according to claim 10 wherein said polycarbonate is the polycarboxylic acid ester of 4,4'-dihydroxydiphenyl-2,2-propane.

13. A transfer sheet according to claim 11 wherein said transfer layer includes substantially equal quantities of a polycarbonate and of chlorinated rubber.

14. A transfer sheet, comprising, in combination, a support sheet; and a transfer layer on one face of said support sheet, said transfer layer comprising an intimate mixture of a polycarbonate non-transferable carrier, coloring matter including pigment in an amount at least equal to the weight of said polycarbonate and of a synthetic material compatible with said polycarbonate and present in a quantity not exceeding the weight of said polycarbonate.

15. A transfer sheet, comprising, in combination, a support sheet; and a transfer layer on one face of said support sheet, said transfer layer comprising a polycarbonate non-transferable carrier having transferable material including pigment distributed therethrough, said pigment being present in an amount at least equal to the weight of said polycarbonate.

References Cited in the file of this patent
UNITED STATES PATENTS

| | | |
|---|---|---|
| 2,820,717 | Newman et al. | Jan. 21, 1958 |
| 2,872,340 | Newman et al. | Feb. 3, 1959 |
| 2,893,890 | Harvey | July 7, 1959 |
| 2,943,952 | Clark | July 5, 1960 |
| 2,944,037 | Clark | July 5, 1960 |
| 2,955,958 | Brown | Oct. 11, 1960 |
| 2,984,582 | Newman et al. | May 16, 1961 |
| 2,989,493 | Clark et al. | June 20, 1961 |
| 3,037,879 | Newman et al. | June 5, 1962 |

FOREIGN PATENTS

| | | |
|---|---|---|
| 392,220 | Great Britain | May 15, 1933 |